United States Patent [19]

Boldo et al.

[11] Patent Number: 5,675,805
[45] Date of Patent: Oct. 7, 1997

[54] PROGRAMMING SYSTEM FOR GENERATING CLIENT AND SERVER PROGRAMS FROM AN UNDISTRIBUTED APPLICATION PROGRAM

[75] Inventors: Irit Boldo, Neve Sheanan; Uri Shani, Givat Adi; Israel Gold, Haifa, all of Israel

[73] Assignee: International Business Machines Corporation, Armonk, N.Y.

[21] Appl. No.: 667,314

[22] Filed: Jun. 20, 1996

Related U.S. Application Data

[63] Continuation of Ser. No. 248,909, May 25, 1994, abandoned.

[30] Foreign Application Priority Data

Aug. 14, 1993 [GB] United Kingdom ............ 9316948

[51] Int. Cl.$^6$ ............................................. G06F 9/45
[52] U.S. Cl. ..................... 395/706; 395/684; 395/707; 395/200.03
[58] Field of Search ........................... 395/200, 706, 395/684, 707, 200.03

[56] References Cited

U.S. PATENT DOCUMENTS

| | | | |
|---|---|---|---|
| 4,916,610 | 4/1990 | Bapat | 364/300 |
| 5,075,847 | 12/1991 | Fromme | 395/700 |
| 5,185,867 | 2/1993 | Ito | 395/375 |
| 5,307,490 | 4/1994 | Davidson et al. | 395/650 |
| 5,325,524 | 6/1994 | Black et al. | 395/600 |
| 5,339,430 | 8/1994 | Lundin et al. | 395/700 |

OTHER PUBLICATIONS

Hofmeister et al, Surgeon: A Packager for Dynamically Reconfigurable Distributed Applications, Configurable Distributed Sys. 1992.

Callahan et al, A Packaging System for Heterogeneous Execution Environments, IEEE Trans. on Software Engr. Jun. 1991, V17, I 6.

Dineen et al, The Network Computing Architecture and System; An Environment for Developing Distributed Applications, Compcon'88 IEEE Conf. pp. 296–299.

Stoyenko, Alexander D., A General Model and Mechanisms for Model–Level Heterogeneous RPC Interoperability, Parallel & Distributed Processing, 1990.

Stoyenko, Alexander D., Supra–RPC: Subprogram Parameters in Remote Procedure Calls, Parallel & Distributed Processing, 1991.

Kishimoto et al, Softon: A Flexible Software Construction Model by Interface Mediation, Compsac 1991.

Shani et al, Distributed–Application Development Tools for DCE/OSF, Services in Distributed & Networked Environments, 1994 conf.

Rancov et al, Context Driven Call: Principles, Globecom '92 IEEE Global Telecommunications Conference, 1992.

*Primary Examiner*—Lucien U. Toplu
*Attorney, Agent, or Firm*—Robert M. Carwell

[57] ABSTRACT

A programming aid for generating interface definition files for client server programs. The system and method are responsive to an input interface definition file and one or more input source code files to extract, from one such input source code file, the semantics of procedures therein intended to be called by a remote procedure call, to detect any conflicts between the extracted semantics and the input interface definition file, to generate an output interface definition file and to report said conflicts to a user. The user can thereby develop a correct interface definition file through an iterative process by modifying the output interface definition file and using it again as the input interface definition file.

1 Claim, 4 Drawing Sheets

| INTERFACE | APPLICATION NODE | | | |
|---|---|---|---|---|
| | A | B | C | D |
| I1 | Im | Im | | Ex |
| I2 | Ex | Im | Ex | Im |
| I3 | Ex | | | Im |
| I4 | | Im | Ex | |
FIG. 4
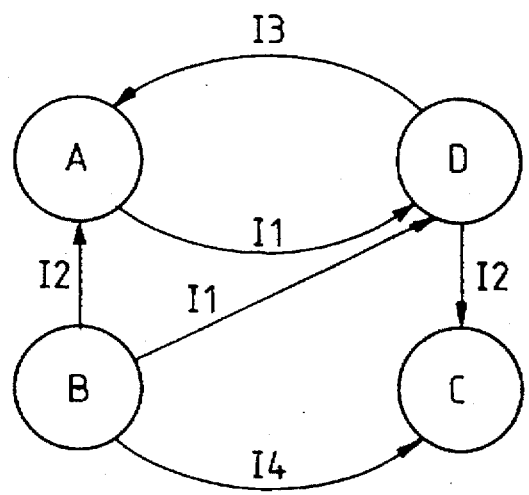
FIG. 5
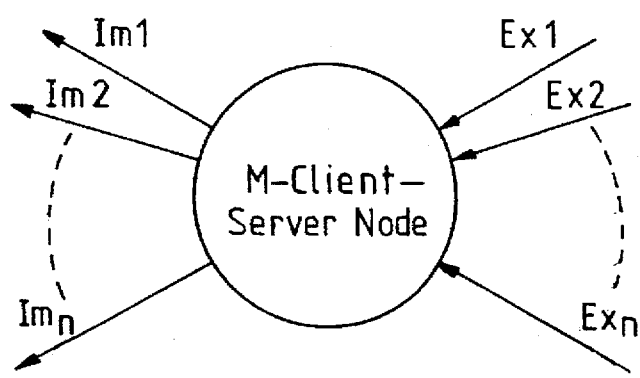
FIG. 6

PROGRAMMING SYSTEM FOR GENERATING CLIENT AND SERVER PROGRAMS FROM AN UNDISTRIBUTED APPLICATION PROGRAM

This is a continuation of application Ser. No. 08/248,909 filed May 25, 1994 now abandoned.

FIELD OF THE INVENTION

This invention relates to distributed computing and, more particularly, to programming aids for client-server application program development.

BACKGROUND OF THE INVENTION

Recently, client-server computing systems have become commonly used. In such systems two or more computer programs, running on the same or different machines, cooperate by exchanging messages either within one machine or over a suitable computing network. A client program sends a message to a server program requesting that the server perform a processing operation specified in the message. The server receives the messages and performs the processing operation in response thereto.

The exchange of messages to perform a remote operation can be presented in the client and server programs as procedures, and is termed Remote Procedure Call (RPC). In the client, the remote operation invocation behaves similarly to a local procedure call. In the server the procedure performs the service as if called from another part of the program on the same machine. Extending the local procedure call method to work across different machines and languages is common in the art of client/server programming.

For example a client program may require a specified file to be printed. To do so it may send a message to a print server program which will print the file and return a message to the client system when this has been completed.

Such distributed programs, in the general case, can be very complicated and require a special type of program written in a particular way to handle the sending and receiving of such messages and the distribution of the function. However, when taking existing conventional programs and turning them into distributed programs, it is desirable to keep the original code intact as much as possible.

This invention is directed to the technical problem of designing suitable programming aids which will enable existing computer programs to be converted into distributed programs, whilst leaving the original program code intact as far as possible.

A client-server computing system is best represented in the general case as a dynamic graph consisting of nodes and links. Nodes are Client and Server programs executing on particular machines, and links are bindings between Clients and Servers. A link can represent a potential binding between two nodes, a connection, or an ongoing remote procedure call (RPC). In such computing systems, a link is generally represented via an interface which defines the format and nature of the interaction between the client and the server. A description of this interface is stored in a suitable symbolic form in a file which is accessible to both the client and the server. These files are compiled to produce suitable object code which manages the interaction between the clients and the servers.

In the Distributed Computing Environment (DCE), which is one type of client-server computing system defined and published by the Open Systems Foundation with which the invention is particularly, but not exclusively, concerned, such interface files are known as Interface Definition Language (IDL) files. The symbolic form of the interface definition is known as the Interface Definition Language.

The topology of a client-server computing system can change and reshape during execution. Nodes may appear and disappear, move around, connect and disconnect in various ways, have multiple connections at a time, gain parallel access or serialized, and so on.

When developing IDL files for Client/Server applications, the developer may need to cope with complex application code. The IDL file has to properly reflect the semantics of the procedures intended to be called by an RPC.

SUMMARY OF THE INVENTION

A first aspect of the invention provides a programming aid for generating interface definition files for client server programs, comprising means responsive to an input interface definition file and one or more input source code files to extract, from the, or each, input source code file, the semantics of procedures therein intended to be called by a remote procedure call, to detect any conflicts between the extracted semantics and the input interface definition file, to generate an output interface definition file and to report said conflicts to a user, whereby the user can develop a correct interface definition file through an iterative process by modifying the output interface definition file and using it again as the input interface definition file.

The automatic extraction of the semantic information from the application sources gives an important advantage. The extracted information is formatted in the applicable IDL syntax, with initial attributes which result from analyzing the source files and which the user can add to and extend as needed. During subsequent development and maintenance steps, the source files implementing the interface represent a separate source to what is written in the IDL file. These two sources are correlated and need to be checked for compatibility to each other.

The inventors have implemented this aspect of their invention for the DCE environment and for applications written in the C programming language. The implementation for C applications is called IDLGEN. It will be understood that implementations are possible in other distributed computing environments or programming languages within the scope of the invention.

In most client-server computing systems, a large set of functions is provided which support the distributed execution environment.

The additional distributed execution support code consists of RPC stubs which are generated by a compiler from the IDL files; and of binding code where communication handles are established and maintained to allow Clients and Servers to communicate. A communication handle is an object representing the connection between a client and a server through which RPCs can be performed.

Thus, a second aspect of the invention provides a programming aid for client server programs comprising means for specifying and storing an application profile defining the structure of a distributed application, and means to generate from the application profile binding code for supporting the execution of the distributed application.

This aspect of the invention results from the realization by the inventors that the additional binding code needed to support the distributed execution environment can be distinguished from the original program logic. Thus a useful programming tool can be provided which automatically generates the additional binding code for the application from a simple symbolic description of the application topology.

The embodiment of this aspect of the invention (referred to herein as GLUEGEN) has been implemented for DCE based on a small but useful set of application models, where binding and application-logic can be differentiated. This solution is applicable to other distributed execution support systems in this area of Client/Server application development.

The combination of these two aspects of the invention provides a useful tool which facilitates the conversion of existing conventional programs into distributed programs.

BRIEF DESCRIPTION OF THE DRAWINGS

Embodiments of the invention will now be described by way of example only with reference to the accompanying drawings wherein:

FIG. 4 shows an interface mapping table;

FIG. 5 shows a distributed application graph;

FIG. 6 shows a general view of a M-Client-Server node;

DESCRIPTION OF THE PREFERRED EMBODIMENT

Figure 1:
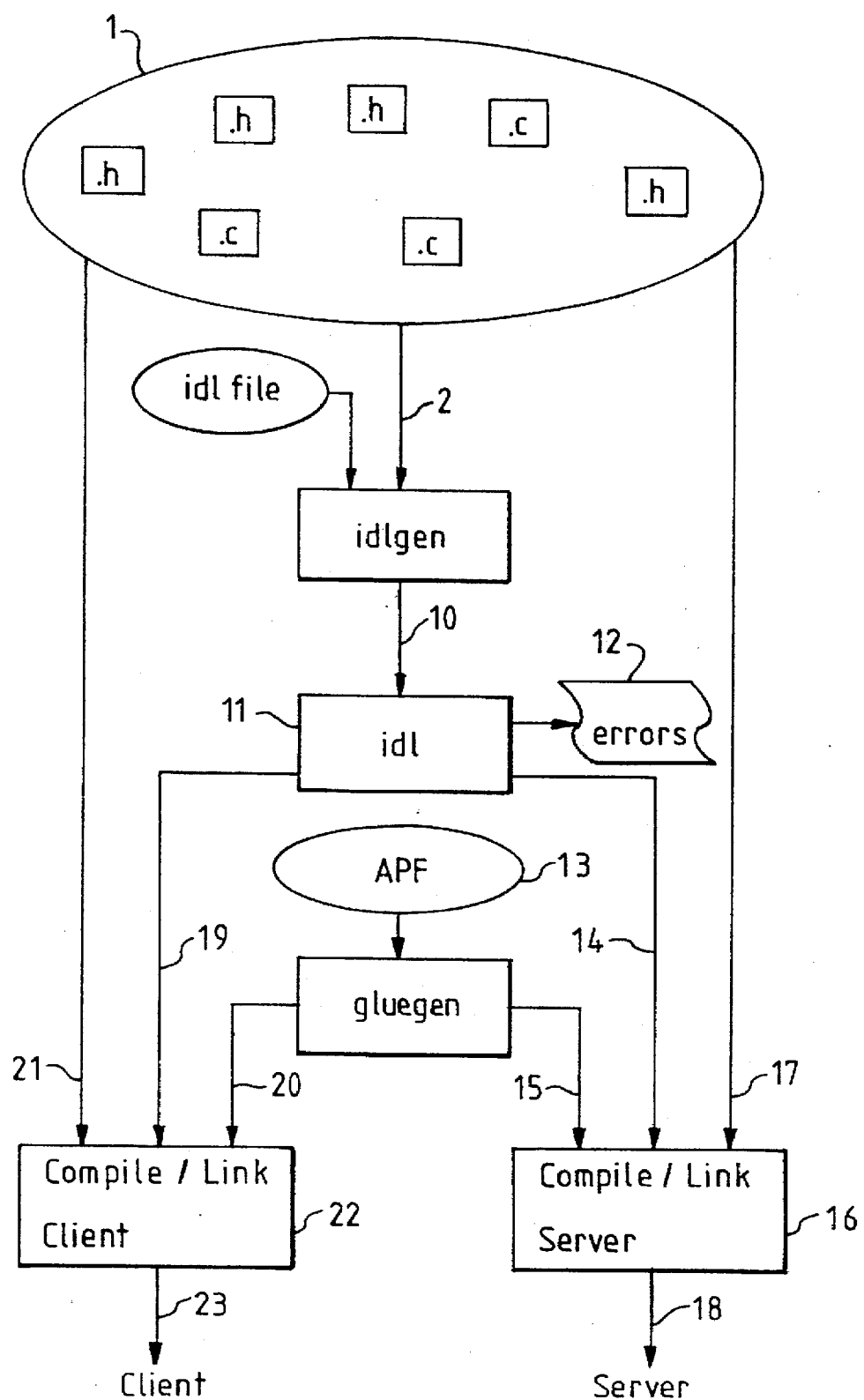
FIGS. 1 and 2 are flow diagrams showing the processing flow of IDLGEN.

First a description will be provided of a representative Interface Definition Language (IDL) file as follows:

THE STRUCTURE OF THE IDL FILE

An IDL file consists of a heading, and can contain the following declarations: Import declarations, Constant declarations, Type declarations and Operation declarations. Every operation represents a procedure to be invoked through Remote Procedure Call (RPC) and has a list of parameters. Each parameter has attributes. The automatic extraction of an IDL file is described below.

IDLGEN FOR C SOURCES

Client/Server DCE applications define the interface between Client and Server via an IDL file. Many other Client/Server systems use a similar technique, although the implementations vary. In DCE, the IDL file (for the C language) is an extension of C with attributes added to existing language constructs, and with few additional language constructs. The implementation of the interface defined in an IDL file is termed MANAGER in DCE. This is a C file which contains similar function signatures (or prototypes) as those written in the IDL file. Those functions which implement corresponding operations in the IDL file, should be compatible.

When developing a DCE Server application, the suggested development path is first to write an IDL file, then to generate a C header (.h) file (using the idl compiler tool of DCE), then include that file in the manager code when writing it.

When retrofitting existing C code, the order of events should be reversed since the "manager" already exists. Therefore, the IDL file should be EXTRACTED from the C sources. Equivalently, during development the mix of C files comprising the manager code can expand, the mix of functions to be used as remote operations can change, and the IDL and manager code should be kept compatible.

IDLGEN aids the programmer in developing his IDL file for a given set of C sources. IDLGEN supports this process by scanning C sources end extracting from them declarations that are relevant to the IDL development. An iterative process evolves in which the IDL file is refined. Whenever possible, IDLGEN will offer to the programmer information about the IDL syntax and legal possibilities. Whenever the C sources are modified, or the IDL file is edited, the files are matched against each other to recover and report any conflicts. Conflicts may cause runtime errors when an implementation of an exported operation, and its definition in the IDL file do not agree.

For instance, global variables are not supported in DCE, so if the application uses global variables IDLGEN will issue a warning to the user and draw his attention to this problem.

IDLGEN works with the given standards established by DCE. To use it, the developer does not have to learn new languages or formal specifications. The same files processed by the C and IDL compilers are processed and/or generated by IDLGEN, thus relieving the programmer from the prerequisite that he knows the IDL language beforehand. In fact, the programmer can learn the little he needs to know of IDL while developing his first DCE server using IDLGEN. Although there is no new language to learn, IDLGEN does introduce some meta comments which help it maintain information in the IDL file, relevant to the C sources, but which the IDL compiler ignores.

IDLGEN PROCESS FLOW

Figure 2:
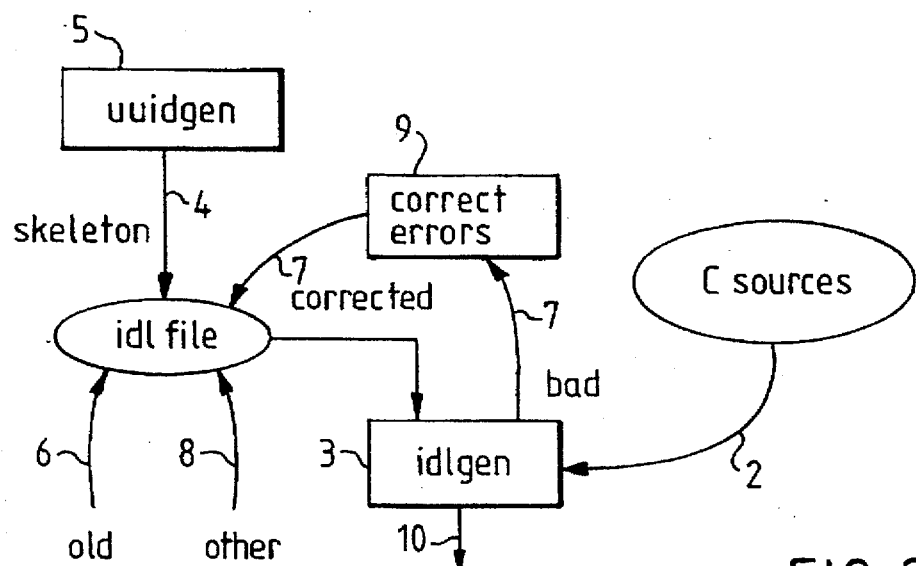

The typical processing path involving IDLGEN is depicted in FIGS. 1 and 2. Numbered items in these figures play the following role in a DCE application development with IDLGEN, 1. A collection of C sources and their .h files is given (1).
2. For any subset of relevant C sources (2), the IDLGEN tool is activated (see ref no 3 in FIG. 2) which takes as input the C source(s), and an IDL file.
3. The IDL file (.idl) comes from four possible sources:
   (i) An initial skeleton IDL file (4) is generated by uuidgen, which is a DCE tool which generates Unique Universal IDs. When activated as uuidgen–i, it generates an IDL skeleton file, containing a uuid in the proper place (5);
   (ii) A existing IDL file (6) is fed into IDLGEN;
   (iii) An erroneous IDL file is corrected by the user and fed again into IDLGEN (7);
   (iv) An existing IDL file (either complete or still in development—8) to be used as an "example" for the IDL file in development.
4. In the basic IDLGEN iteration step (3) the user corrects and updates (9) the IDL file (8) until a good and legal IDL file is generated (10 in FIGS. 1 and 2).
5. The "good" IDL file is fed into the idl compiler (11), where "good" means that there is nothing else IDLGEN can do about it, although the idl compiler may still detect more errors. In cases where no final decision was made by the user in the IDLGEN step (3), the IDL file will not pass the idl compilation step (11) which will then generate error and warning messages (12).
6. A successful idl compilation generates stubs (14, 19).
7. The programmer has to provide additional "glue" code (15, 20) which will startup the server, and the client, so they will bind at runtime to resolve the RPC services required. In this embodiment the glue code is generated by the tool GLUEGEN discussed below from application considerations set out in an Application profile file (13).
8. From the files generated by the idl compiler, some (14) are needed to be compiled and linked (16) with the glue code (15) and some of the sources (17) to create the server program (18).

9. Similarly to the server, another set of idl-generated files (19) with some glue code (20), and a portion of the C sources (21) are compiled and linked (22) to generate the client program (23). A most simple C program such as "f(a,b){return a+b;}" can provide an immediate demonstration of generating a legal IDL file by IDL-GEN on an IBM AIX Operating System as follows (IBM and AIX are trademarks of International Business Machines Corporation),

```
echo 'f(a,b){return a+b;}' ! IDLGEN -id
Which produces the following execution report by IDLGEN:
    MakeDCE 1.0 - Enabling tool for DCE
    No input file - reading from standard input
    Processing file '-stdin' ....... C source file.
    Output idl file is 'standard output (stdout)'.
    Successful completion
And the following IDL file:
    interface noname {
/*@:***********************************************************
* This file built with the MakeDCE facility for DCE ver 1.0    *
*    - A DCE Application-Development Enabling Tool             *
* Initially generated on Sun Jan 31 08:45:12 1993              *
*    Last update on Sun Jan 31 08:45:12 1993                   *
***************************************************************/
/*@[export] f ; file - stdin */
long int
f (
[ in] long int a,
[ in] long int b
);
}
```

META-COMMENTS IN IDL FILES

C and IDL files do not fully overlap. Information which is generated during IDLGEN processing needs to be maintained. This information relates to differences between the two sources, and to IDLGEN-specific needs. One choice of solution could be to maintain a side-looking file and associate it with the IDL file (like .acf files in DCE). To eliminate the logistics of working with additional files, IDLGEN keeps this information within the IDL file as META-COMMENTS. A meta-comment appears to the idl compiler just as yet another comment to be ignored. It appears to the user as an informative comment which makes the code in the IDL file more comprehensible. Meta-comments are maintained by IDLGEN fully automatically and are limited in extent, requiring the user to learn an extremely small addition to the IDL language.

Meta-comments have the following general format:

```
─── META COMMENT ───
/*@[meta-statement];[comment]*/
```

The meta-statement is syntactically checked and parsed by IDLGEN, while the comment part is a separately distinguished unparsed string of text. IDLGEN uses meta-comments for three main purposes:

1. As a disclaimer header which identifies IDLGEN as the generator of the file contents, displaying the generation and last modification dates.
2. To list exported symbols and symbols banned from exportation, etc. (see below).
3. To keep C-contextual information in the IDL file, where the idl compiler does not support compatible syntax with C. Currently this is used only to maintain tags of enums which cannot exist in IDL files, but which IDLGEN will recognize from a meta-comment in the file (see "Enum tags" below). Another use is for conversion of valued-enums in C to IDL consts and handling long C identifiers which are too long for IDL.

EXPORT/NOEXPORT META-COMMENTS

Input IDL files to IDLGEN are matched against C sources. Naturally, not everything exportable from a C source is a candidate for an export in the IDL file. Due to C programming habits, many symbols are defined as GLOBAL symbols. To be an exportable global symbol, a C source should NOT have the keywords static or extern in front of a function or a variable declaration. When IDLGEN scans a C source (which is preprocessed so that all #include C directives are expanded), it considers ALL global symbols as candidates for IDL export as follows:

For variables—all non-static symbols defined in the file, and imported symbols defined elsewhere (which have the EXTERN storage class).

For functions—only non-static symbols which are defined in the file. The user can exclude symbols from being considered, or designate other symbols to be considered through meta-comments in the IDL file.

The only symbols which IDL can export are functions, which are termed operations in DCE terminology. Global VARIABLES cannot be passed automatically between DCE clients and servers in an RPC. The programmer must alter his C sources or re-design his application so that all "globals" are included as explicit parameters in some or all of the operations. IDLGEN will generate a warning message whenever a C source contains globals which are not excluded via a meta-comment, unless the –g switch is set.

When an input IDL file exists, it may already define some exported operations. When starting off to build a new IDL file, a list of the functions to be included as export candidates has to be generated. IDLGEN maintains this list in the IDL file in meta-comments. When a new IDL file is initially generated, all global names in the C sources are entered into the generated IDL file. Function names are marked as candidates for export, while global variables are marked for no-export. This information will alert the programmer to look at this list and make some decisions before continuing. Altering this list will cause IDLGEN to extract different things from the C sources.

An export/noexport meta-comment can appear anywhere in the file, but will always be reproduced by IDLGEN at the beginning of output IDL file. Moreover, IDLGEN will produce one meta-comment line per each name in meta-comments of the input IDL file (see below).

Syntax:

```
———— META-COMMENT ————
/*@[{export l noexport l tbd(export) ltbd(noexport)}]
name, . . . ; [text]*/
```

/*@. . . */
Note: in the above terms separated by l are alternative possibilities.

Meta-comment delimiters. "*/" should not be used anywhere inside a meta-comment.
export
  Designates symbol names that follow to be exported.
noexport
  Designates symbol names that follow to be excluded from export in the IDL file.
tbd( . . . )
  Designates that the symbol has been added by IDLGEN to the meta-comment list for an existing IDL input file, and have to be considered by the user, with the value in the parentheses as the recommended one. The possible values are export and noexport.
name
  A symbol name. All symbols in this list share the same designation as specified in the statement head.

[text]
Optional free text following the ending semicolon -- kind
of an internal comment. IDLGEN will initially place here
the name of the source file where the symbol has been
declared. If the user changes this text, it
will be copied as is.
For Example:
/*@ [ export ] Advance, GetRecord, PutRecord ; from
test. c */
/*@ [ noexport ] count, state ; from tools.c */

Here the functions Advance, GetRecord, and PutRecord are designated as export candidates, and have been declared in the C source file test.c. However, the global variables count, and state, which have been declared in tools.c, are excluded from exportation.

EXPORT DECISION MAKING

A symbol is considered for export under the following rules: Symbols defined as STATIC or EXTERN are either local or import, respectively, and cannot be exported. Global symbols which are not marked NOEXPORT will cause an error message (unless –g is set), and will not be exported. Operations defined in an IDL file, and not marked NOEXPORT will be exported. The resulting IDL file will generate a meta-comment for them, marking them EXPORT.

Functions in C sources which are marked EXPORT in a meta-comment in an IDL file, will be exported. "Illegal" functions in C (which cannot be used as remote operations— currently only such which use variable-number of arguments, e.g. void foo (int a, . . . ) . . . ). Such functions are marked as NOEXPORT in new IDL files, and TBD (NOEXPORT) in additions to old IDL files. If an IDL file marks such a function as EXPORT, an error message is issued.

In the following example, IDLGEN extracts all global functions defined in the source file, and makes them exportable operations in the generated IDL file.

```
uuidgen -i > test.idl
IDLGEN test.idl test.c -o
IDLGEN test.idl test.c -o
```

EXPLANATIONS: The first line generates an empty IDL file. The first execution of IDLGEN generates an initial IDL file containing meta-comments excluding all global variables, and including all global functions defined in the file test.c as exportable. The second execution of IDLGEN places in test.idl all needed declarations for the exported operations, based on the functions which implement them in the C source.

NUMBER OF INPUT IDL FILES

Multiple IDL files can be processed together only via IMPORT statements in one IDL input file. When the IDL file is re-generated, the declarations in import files are not reproduced in the output file. Only IMPORT statements for these files are generated.

A more complicated case is when there are multiple input IDL files at the command-line level. In this case we have three "classes" of IDL files: main IDL file—which is the only IDL file in the file list, for which a new version will be reproduced at the end EXAMPLE IDL files—which are used to fill in declarations that may be needed in the generated file, and cannot be found in any of the import files thereof. Example files will be distinguished by a special –xmp switch; and import files—either in the main or example IDL files, or recursively imported in other import files. It will be understood that EXAMPLE files could be used as a means to provide default IDL attributes and to lend IDL specifications to newly generated and developed IDL files, from a given set of previously developed IDL files. This feature has not been implemented in the current embodiment.

ORDER OF INPUT FILES

When input files are scanned, symbols are encountered and inserted into the symbol-table. The initial order of insertion in this table is preserved, and is used as a basis for generating the output IDL file.

It is possible that different C files will define symbols in different orders, or that the user will alter the order of declarations (as long as they do not introduce IDL errors) in the IDL file (using a text editor). To preserve the order of declarations in the input IDL file, it should be the first input file name in the command line.

Aggregate C Types

In IDL, all type definitions come in the form of constants, typedefs and operations. Typedefs are actually a declaration of a new name for a type.

In C, aggregates can also be defined as pure types with no connection to any typedef, or with relation to a file-level variable. When scanning a C file, a parameter of a function can be defined using a basic form of an aggregate (eg, void foo( struct s parm );). When converting to IDL declarations, these aggregates have to be converted to typedefs. Since there is no name for a typedef, it has to be GENERATED by IDLGEN. The new names are composed from contextual information so that they are unique in the file, but will be generated in the same way for additional files with the same context. A consistent naming convention like this is required in order to properly identify symbols to be matched in related files. For example, the aggregate

```
struct s...;
will be redefined as
typedef struct s..._s_MKGEN...;
Anonymous C Aggregates
    When a C aggregate has no tag, one is made up for it
by IDLGEN in a way which depends on its context and
ensures consistent matching for that type between the C
and IDL files. For instance, the anonymous structure in
this function prototype,
void foo( struct { int i;} x) ...
is converted to a tagged structure as follows:
typedef struct _foo_x_MKGEN {
long int i;
    } foo_x_MKGEN;
void foo( [in] foo_x_MKGEN x);
```

Type Matching

When two input C files include the same .h file, the same declaration will appear twice. In this case, they are exactly the same. In other cases, due to careless programming practices, the same declaration may appear in separate C sources as two distinct objects (having two separate sources). In the latter case, the two types may not be exactly compatible. Currently, the latest declaration will take over, but the two declarations (new and old) are compared, and a warning is issued if they are incompatible.

In the case of same include file, both declarations will be the same. A method to help processing duplicate include files is to record names of processed include files, and thus ignore include files that have already been processed. Note that since we scan multiple (preprocessed) C sources, we cannot use the common method recommended for C programs to prevent duplicate inclusions of C includes by defining (and undefining) specific preprocessor symbols.

The Case of sizeof(), and enum-items

To check compatibility of array sizes in C declarations and IDL files, IDLGEN computes the constant expressions in IDL, and in C sources. In case the program uses sizeof(), which is a compiler-specific internal operator, to set the size of an array, it cannot be used in an IDL file and IDLGEN issues an appropriate warning message that size-comparison cannot be done. When the size expression involves enumeration-items, that expression cannot be part of the IDL file. If the IDL file is generated with such expressions after all, an error is reported.

Breaking long indirections

C allows declarations to have any lengthy chain of indirections. In IDL there are certain limitations on indirections and arrays. It is also impossible to specify different addressing attributes to the various levels of indirections unless they are separated into simple cases. This can be done by breaking long chains of indirections into chains of TYPEDEFs. If the –b switch is set in the command line, this will automatically be done by IDLGEN. Otherwise, a warning message is issued.

In a specific case, when a function returns a pointer, it is always converted to a newly invented typedef where the indirection is hidden—due to the current idl compiler not accepting IDL files with pointer function values, although the documentation does not preclude the case.

Special New IDL Keyword

When new IDL attributes are needed for a newly generated IDL declaration, which has been extracted from a C source, IDLGEN can generate a reasonably correct declaration. This will be processed correctly by the IDL compiler, but may not be the correct choice. Therefore, IDLGEN will generate a new IDL declaration using new keywords (see below) which will signal that the user has to enter something else instead (or approve what IDLGEN generated). If the user passes the resulting IDL file with no changes to the idl compiler, it will complain of syntax errors. If passed again to IDLGEN, these keywords will be removed so the attributes generated by IDLGEN are assumed acceptable to the user.

IDLGEN uses two such special keywords currently: MK_DEFAULT, and MK_ERROR. The first is used whenever IDL attributes are generated by IDLGEN, the latter is used whenever an apparent incompatibility is detected between a declaration in an IDL file and its corresponding C counterpart. When an input IDL file to IDLGEN has special keywords, the MK_DEFAULT keywords are removed, but the MK_ERROR keywords are left for the user to remove after making the proper corrections.

Another method to get rid of the MK_DEFAULT special keyword is to use the –d command-line switch.

Function pointers as parameters and aggregate fields

Parameters and aggregate fields can be function pointers. Such parameters and aggregate fields are illegal for IDL, they need to be detected in the C files and should not be used in the IDL file. IDLGEN issues error messages when IDL operations make use of such declarations directly or indirectly.

Matching Unions

Unions in C and IDL will match even when their fields have different orders. Unions in IDL have selection information and attributes: typedef union _u switch(long s) {

```
case 0: long int i;
case 1: double d;
} u;
```

When a union in a C file is changed and new fields are added, the IDL union attributes need to be extended and applied also to the new union fields. For the above example, if a new field char c is added, it will be automatically entered as:

```
case 2: char c;
```

CONVERT ENUMS TO CONSTS

Enums in C may have values:

```
enum e {        a= 4,
                b= a+2 };
```

This is not allowed in IDL. Yet, such values can also be used in constant expressions:

```
int array[b];/* to mean int array[6];*/
```

When the values of enums are ignored, arrays in the IDL files have illegal values. A simple solution is to replace the enum values with constants. A more appropriate solution is to generate IDL consts for the enum items as follows:

```
typedef enum /*@e;*/ {
   a,b } e_MKGEN;
const long /*@enumitem;*/ a=4;
const long /*@enumitem;*/ b=a+2;
typedef long int array[b] array_MKGEN;
```

Meta-comments are used to preserve affinity between generated consts and original enum items.
Enum tags IDL language does not accept ENUM with tags. All enum aggregates must have a TYPEDEF, and have their tags removed. To maintain affinity between the IDL file and its C source, the tag is entered into the IDL declaration inside a META-COMMENT. The IDL compiler will ignore this as a comment, while IDLGEN will read the tag name and be able to associate it with the corresponding C source construct for type matching. Carrying the tag name into the IDL file will also be a helpful information for the user.
Bit-Fields The IDL language does not accept bit-fields in STRUCT, and UNION aggregates. These parts of the structure are removed before the IDL file is generated by IDLGEN. Alignment (nameless) fields are removed, and other bit-fields are left without their bit-location part. In cases where two structures with bit-fields in C files are compared, bit-field location values are compared as well. When a structure in a C file with bit-fields is compared with a corresponding IDL structure, a warning message is issued.
cobol to idl FOR COBOL SOURCES Cobol_to_idl is a second embodiment of this aspect of the invention that accepts COBOL sources as input. The output of cobol_to_idl is an IDL specification of the interface to those sources so they can be called from a C environment via RPC. While running cobol_to_idl the application developer does not need to know COBOL. The COBOL programmer does not need to know Distributed Computing Environment (DCE) and Interface Definition Language (IDL).

THE TRANSLATING PROCESS PERFORMED BY cobol_to_idl

The translating process is activated for a COBOL source or for several COBOL sources and it does the following:

1. Generates interface header using DCE standard utility uuidgen for generating the UUID attribute;
2. Generates constant definitions, when having constants in COBOL sources;
3. Translates COBOL types to RPC IDL types.
4. Generates typedefs for Cobol types. A UNION TYPEDEF is generated when COBOL REDEFINES clause appears in the COBOL source. A STRUCT TYPEDEF appears for COBOL records or sub-records. TYPEDEF may appear for COBOL array. The STRUCT, UNION, and ARRAY basic TYPEDEFs are used in any combination (for example, for an array of STRUCTs which contains a UNION of UNIONs of STRUCTs) to construct compound new definitions of TYPEDEFs in the IDL file in an automatic way. Those TYPEDEFS are reused for COBOL sub-records that actually have the same structure and have for same COBOL types;
5. Generates an operation name for a COBOL procedure division;
6. For each operation it generates a list of parameters according to COBOL variable declarations that reside in the linkage section of a COBOL program;
7. Makes decisions, according to the semantics of the COBOL sources, about the parameter attributes. It decides if parameters are input, output or input-output.

FLOW OF DATA

Figure 3:
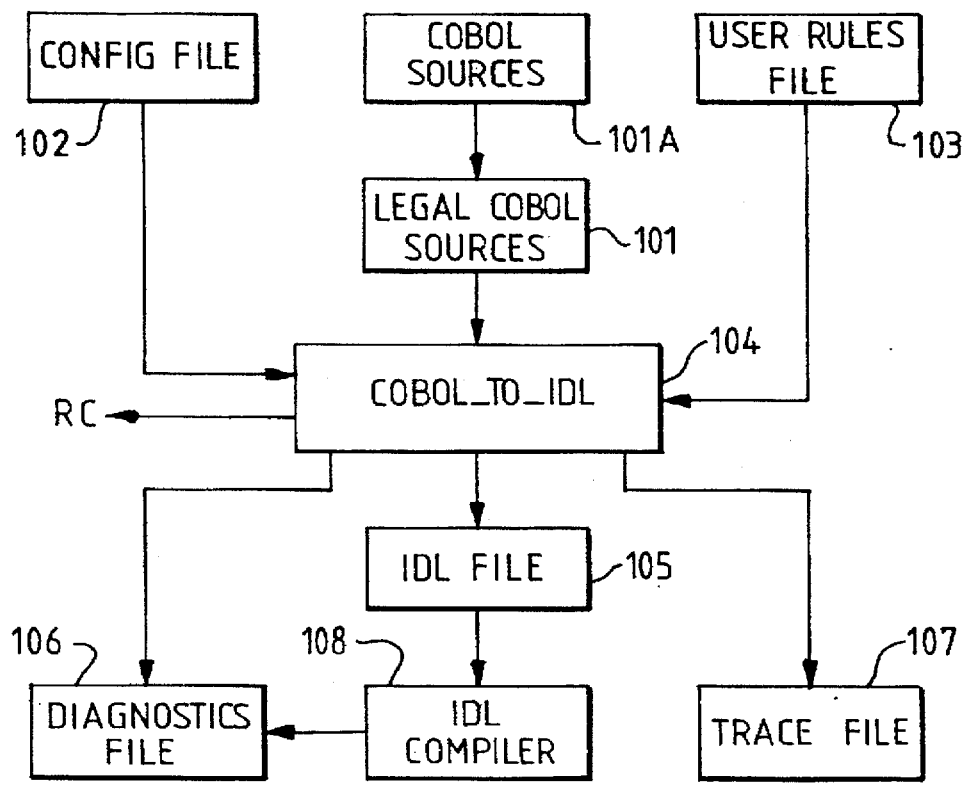
FIG. 3 shows a typical processing path of cobol_to_idl.

A typical processing path of cobol_to_idl will be as depicted in FIG. 3, and it goes as follows:

1. Every COBOL source is first compiled 101A. Only legal sources pass to the next stage;
2. A collection of legal COBOL source files is given 101;
3. The cobol_to_idl process 104 is activated for a COBOL source or for several COBOL sources. cobol_to_idl will do the translating process described above;
4. A Configuration File 102 is an optional input to the tool, which substitutes or adds information to the parameters that appear in the command line that activated cobol_to_idl;
5. A User's Rules File 103 is an optional input to the tool. It consists of directives to the tool, such as what is the value of the version attribute in the IDL.
6. cobol_to_idl produces an IDL file 105 and a return code (rc). The decision what to do with the IDL file (e.g. put it in a library) is according to the rc.
7. A diagnostics File 106 is produced containing warnings, errors, and other diagnostic information;
8. There is an option to produce a trace file 107.
9. Output IDL files with a "good" return code will pass to the next stage and will be compiled by the IDL compiler 108. New diagnostics will be appended to the DIAGNOSTICS file 106. Only IDL files that passed this stage successfully will be put in the library.

GLUEGEN

When taking existing applications and turning them into distributed applications, it is desirable to keep the original code intact as much as possible. The additional code needed to support the new distributed execution environment can thus be distinguished from the original application logic. In the case of DCE, there is a large set of functions which support the distributed execution environment.

The additional distributed-execution support code consists of the RPC stubs which are generated by a compiler from the IDL files as described above and of binding code where communication handles are established and maintained to allow clients and servers to communicate.

GLUEGEN is a tool for generating the additional binding code for the application. This embodiment has been implemented for DCE, based on a small but useful set of application models, where binding and application-logic can be differentiated. This solution is applicable to other distributed-execution support systems in this area of Client/Server application development.

An operational DCE application is best represented in the general case as a dynamic graph consisting of nodes and links. Nodes are client and server programs executing on a particular machine, and links are bindings between Clients and Servers. A link can represent a potential binding between two nodes, a connection, or an ongoing remote procedure call. As described above, in DCE, a link is represented via an interface, as described in a particular IDL file.

The topology of an application can change and reshape during execution. Nodes may appear and disappear, move around, connect and disconnect in various ways, have multiple connections at a time, gain parallel access or serialized, and so on. The most general situation can only be implemented by coding a program in a general-purpose language which uses the DCE-RPC primitives.

Although the general task of DCE programming is very broad, we are looking for a formal description of this task so that generic templates can be prepared ahead of time and be used to easily build useful DCE applications in a short time.

DCE applications can be separated into two domains:

(i) The DYNAMIC DOMAIN which represents dynamic DCE applications which are hard to describe in the general case with less than a full general-purpose programming language;

(ii) The STATIC DOMAIN which represents static DCE applications where each DCE node may be described by potential connections it can have with the rest of the world.

DCE applications can fall in either domain, or have a mix of both. Those parts of an application which can be described as static, are addressed in this disclosure. Such a description is depicted in FIG. 5. We have two major goals: First, to define the details of a single interface (link) between DCE nodes of which the IDL file is a major component, and second to automatically combine multiple interfaces into DCE applications.

DISTRIBUTED APPLICATION MODEL

A DISTRIBUTED APPLICATION can be viewed as a Directed Graph of APPLICATION NODES as shown in FIG. 5. An edge in the graph represents a collection of RPC-able operations and is named after the DCE INTERFACE describing these operations. The edge arrowhead represents the direction of an RPC; an edge I2 directed from node B to node A specifies that interface I2 is imported by node B (source of edge) and exported by node A (target of edge).

When an application node imports a given interface it is said to be a client of that interface, and when it exports a given interface it is said to be a server of that interface. An application node cannot import and export the same interface.

INTERFACE MAPPING TABLE

Given a distributed application graph, the INTERFACE MAPPING TABLE lists which Interface is exported/imported by each application node. For example, FIG. 4 is the interface mapping table of the distributed application graph in FIG. 5.

A single application node may import and/or export multiple interfaces. Moreover, a particular interface may be exported by several application nodes. In our example, interface I2 is exported by nodes A and C.

APPLICATION NODE TYPES

Application nodes are characterized by the combination of interfaces they import and/or export. We define the following node types:

SERVER NODE—an application node that exports a single interface;

CLIENT NODE—an application node that imports a single interfaces;

M-SERVER NODE—an application node that exports multiple interfaces;

M-CLIENT NODE—an application node that imports multiple interfaces;

M-1-SERVER NODE—an application node that exports multiple interface and imports a single interface;

M-1-CLIENT NODE—an application node that imports multiple interfaces and exports a single interface;

M-CLIENT-SERVER NODE—an application node that exports and imports multiple interfaces.

For example, in FIG. 5 node C is a M-SERVER, node B is a M-CLIENT, node A is a M-1-SERVER, and node D is a M-1-CLIENT. The general view of a M-Client-Server node is depicted in FIG. 6.

GLUEGEN is a tool which when provided with a description of application topology generates the necessary glue-code to make a complete Client/Server application. The application topology is defined via a set of parameters some of which are defined in the DCE documentation, while some others are introduced here specifically for GLUEGEN. The parameters are organized in two levels we call: interface profile, and application profile.

A simple formal language is used to compound these parameters and use that to generate glue-code which performs the claimed solution.

INTERFACE PROFILE

A formal method is used of defining an INTERFACE PROFILE and combining several interface profiles into a single APPLICATION PROFILE. The interface profile contains a number of parameters which affect the initialization process and the binding method that an application node uses, with respect to a given interface. Client and Server nodes of a given interface may have different interface profiles, although proper binding of the two at run-time can be guaranteed only by using compatible or identical profiles.

The interface profile parameters are divided into two categories: compile-time parameters and run-time parameters. Values of compile-time parameters must be specified in the interface profile. Values of run-time parameters may be specified in the profile, or later at run-time upon invocation of the Client and Server applications.

The following list describes the interface profile parameters. The notation

PARAMETER=value is used to describe a parameter and its possible values.

The names and terminology used here are taken much as possible from the DCE manual, OSF(TM) DCE 1.0, "Applications Development Guide," published by Open Software Foundation, 11 Cambridge Center, Cambridge, Mass. 02142

PROTSEQ=protocol-sequence. A run-time parameter that defines a valid combination of communication protocols, for instance:

ncadg_ip_udp or ncaca_ip_tcp.

HOST=host-addr. A run-time parameter that identifies a specific host system that exports the interface services. The format of host-addr depends on the network protocol in PROTSEQ. For example: 129.35.65.233 for ncadg_ip_udp.

EP=endpoint. A run-time parameter that defines a communication endpoint for the specific server instance that exports the interface services. For example: 1027.

EPTYPE=endpoint type. A new term invented for GLUEGEN, which is a runtime parameter for server applications, specifying whether the endpoint defined by the EP parameter is unique or shared. A unique endpoint-type is guaranteed to be used by only one interface. A shared endpoint type may be shared by more than one interface of the application. Possible values are: unique or shared.

OBJ=object-id. A run-time parameter that specifies a particular object UUID (universal unique identifier) to be used for binding the proper server. When the specified interface is associated with multiple server instances, the OBJ parameter may be used to refine the selection of the requested server instance. For example: 30DBEEAO-FB6C-11C9-8EEA-08002B0F4528.

NSE=name-service-entry. A run-time parameter that specifies the path name of an entry stored in the Cell Directory Service database, by which binding with proper server can be done. The path of the named entry can be global CDS name, i.e. containing the / . . . prefix, or relative CDS name, i.e. containing the /.: prefix. For example, /.:/hrg/server-1.

BINDTYPE=binding-method. A compile-time parameter that defines the method for obtaining the binding information for the binding parameters described above. The binding-method may be one of the following: string, lepm, repm, ns.

This parameter also determines which of the binding parameters defined above will be used to bind that interface at run-time. The minimal required set of binding parameters is: PROTSEQ, HOST and EP. Other binding parameters like interface UUID and Version are determined automatically. The OBJ parameter is optional, and the NSE parameter is required only when using the Name Service database.

STRING Denotes that the binding method used is full string binding. The user should supply the binding parameters (possibly at run-time) and none is determined automatically. In this binding type the Client and the Server may run on different hosts. The Server requires only the PROTSEQ parameter and may need to output its dynamically allocated endpoint (the output method to be used is defined in the application profile. The Client requires all three binding parameters mentioned above to accomplish full string binding; some parameters may be specified by the interface profile and others at run-time.

LEPM Denotes that the Server endpoint is allocated dynamically and should be resolved by clients using the local endpoint map maintained by the rpc daemon (RPCD). The OBJ parameter, if defined, is used for resolving the Server endpoint. In this binding type the Client and the Server are assumed to run on the same host. The HOST parameter is determined automatically, and only the PROTSEQ parameter is required by both Client and Server. The Server job is to register its endpoint in the local endpoint map, and the Client has to resolve its partial server binding using the same endpoint map.

REPM Denotes that the Server endpoint is allocated dynamically and should be resolved using a remote endpoint map. The OBJ parameter, if defined, is used to resolve the Server endpoint. In this binding type the Client and the Server may run on different hosts. Only the PROTSEQ and HOST parameter are required. The Server Job is to register its dynamically allocated ENDPOINT in its local endpoint map, and the Client has to query the remote endpoint map, using the HOST parameter, to obtain the Server endpoint.

NS Denotes that the binding parameters: PROTSEQ, HOST and EP are resolved automatically using the Name Service database and the endpoint mapper (rpcd daemon). The NSE parameter must be specified, and together with the OBJ parameter is used to resolve the binding information stored in the name service database. In this binding type the Client and the Server may run on different hosts and the CDSCLERK programs on both hosts should be running. Using the NSE parameter, the Server has to export its binding information into the name service database and the Client has to import that information from the database.

ROLE=interface-role is a compile-time parameter that specifies whether the interface is exported or imported by the given application. This parameter is not explicitly part of the DCE documentation. interface-role may take one of two values: IMPORT or EXPORT.

HANDLE =handle-type is a compile-time parameter that defines the type of handle to be used by the interface. Handle type may be one of: implicit, explicit or auto.

idl=idl-file is a compile-time parameter that specifies the name of the IDL file describing the services provided by the interface.

INTERFACE PROFILE EXAMPLE

Consider the distributed application graph in FIG. 5. Observe that interface I1 is exported only by node D. To model dynamic endpoint allocation and binding for I1, we can use the following interface profile.

| interface profile for I1 |
| --- |
| PROTSEQ = ncadg_ip_udp<br>HOST = nodeD<br>BINDTYPE = repm<br>HANDLE = explicit<br>IDL = "I1.idl" |

APPLICATION PROFILE

DCE applications are configured by using application profiles. To form an APPLICATION PROFILE, one or more interface profiles are combined together, with additional global parameters, possibly overwriting some interface profile parameters. Like interface profile, application profile is also a new term introduced by the inventors.

APPLICATION PROFILE PARAMETERS

As above, we use the notation PARAMETER=value to denote a parameter and its possible values. Most of the parameters of an application profile are not defined in the DCE documentation and have been invented for GLUEGEN. To formally specify an application profile, we use the Application Profile Language discussed in the next section.

NTHREADS =n specifies the maximal number of service threads to be used by a Server application. This number may be either less than, or greater than the number of interfaces exported by the application. By default, n is 1 which means that service requests will be processed serially.

FINPUT=user-input-function() is a new term invented for GLUEGEN which names a user supplied function for obtaining values of interface profile parameters at run-time. Examples of run-time parameters are: PROTSEQ, HOST, EP, etc. Parameter values may be retrieved from command arguments, a file, or any other input. The function is invoked as part of the Client/Server initialization process and prior to any binding attempt of importing/exporting interfaces. If the FINPUT parameter is omitted, a default function:

mk_parse_command_args() is provided by GLUEGEN to scan the command arguments. Another function provided by GLUEGEN is mk_stdin() that reads parameter values from the standard input. This function has a counter-part mk_stdout() for writing parameter values to the standard output (see the FOUTPUT parameter, below).

--- user-input-function( ) should have the following prototype

```
/* function result:   NULL pointer on failure,
**                    parameter value on success
*/
char *user_input_function (
        char *interface, /* name of interface for
which parameter is inquired. If empty string or NULL
pointer, value of parameter is taken as default for all
interfaces */
        char *parameter,  /* name of parameter for which a
value is inquired */
        int *argc,        /* number of command arguments */
        char **argc,      /* command argument vector */
        int opcode);      /* MK_IO_BEGIN, MK_IO_NEXT,
MK_IO_DONE */
    The user_input_function should be modeled as follows:
        user_input_function(. . ., MK_IO_BEGIN)- to open input
file
        user_input_function(. . ., MK_IO_NEXT) - to obtain
binding
parameters
        user_input_function(. . ., MK_IO_DONE) - to close input
file
```

---

FOUTPUT=user-output-function() is a new term invented for GLUEGEN which names a user supplied function that outputs values of binding parameters. The function is invoked as part of the Client/Server initialization process and after all binding operations of imported/exported interfaces have been completed. If the FOUTPUT parameter is omitted, a default function:
mk_stdout() is provided by GLUEGEN to write binding information to standard output (using a compatible format for the mk_stdin() function as defined above). A similar function mk_stderr writes binding information to standard error output.

The FOUTPUT function may be ignored by assigning to it the mk_null function.

---

```
user_output_function( ) should have the following
protptype
/* function result is 0 for success, error otherwise */
int user_output_finction (
        char *interface,  /* name of interface for which
parameter is provided*/.
        char *parameter,  /* name of parameter for which a value
is provided */
        char *value,      /* pointer to the string containing
the value of the specified parameter.*/
        int opcode);      /*MK_IO_BEGIN, MK13IO_NEXT,
MK_IO_DONE */
The user_output_function should be modeled as follows:
user_output_function(...,MK_IO_BEGIN)- to open output file
user_output_function(...,MK_IO_NEXT)- to output binding parameters
user_output_function(...,MK_IO_DONE)- to close output file
```

---

INTERFACE=interface-profile associates an interface profile with the specified application. The profile describes the initialization process and the binding method to be used by the application, with respect to the specified interface.

The INTERFACE parameters may have multiple occurrences each associating the application with a different interface.

APPLICATION PROFILE SPECIFICATION LANGUAGE

Formal specification of application profiles is facilitated by means of an APPLICATION PROFILE LANGUAGE. This language has been invented for GLUEGEN. Complete syntax of the language is provided below. In this section we give an informal description of the language by presenting few application profile examples.

An application profile generally contains two types of statements. An interface statement that defines an interface profile, and an application statement that defines a collection of interfaces together with additional global parameters.

For example, consider the distributed application graph in FIG. 5. Application node A imports interface I1 and exports interfaces I2 and I3. Definition of application node A using the Application Profile Language might look as follows:

---

```
/* Application Profile for Node A */
INTERFACE I1 {
    PROTSEQ = ncadg_ip_udp;
    HOST = nodeD;
    BINDTYPE = repm;
    HANDLE = explicit;
    IDL = "I1.idl";
}
INTERFACE I2 {
    PROTSEQ = ncadg_ip_udp;
    BINDTYPE = lepm;
    HANLDE = explicit;
    IDL = "I2.idl";
}
INTERFACE I3 {
    PROTSEQ = ncadg_ip_udp;
    BINDTYPE = lepm;
    HANDLE = explicit;
    IDL = "I3.idl";
}
APPLICATION appA {
    FINPUT = mk_parse_command_args( );
    FOUTPUT = mk_null( );
    NTHREADS = 1;
    IMPORT I1;
    EXPORT I2;
    EXPORT I3;
}
```

---

The application profile above defines an application named appA. The interface run-time parameters provided with command arguments for appA will be parsed using the mk_parse_cmd_args() function, and no binding information will be output.

Application Profile using Preprocessor Directives

The user may gain more flexibility by separating the definition of interfaces from the definition of applications. To this end, the Application Profile Language is allowed to contain an include and define statements which have the same meaning as for the C language macro-processor.

For example, let the INTERFACE statements for I1, I2, and I3 of appA be stored in files I1.ipf, I2.ipf, and I3.ipf, respectively. An equivalent application profile for appA will look as follows:

```
/* Application Profile for Node A using
** interface profiles: I1.ipf, I2.ipf and I3.ipf
*/
#include "I1.ipf"
#include "I2.ipf"
#include "I3.ipf"
APPLICATION appA {
    FINPUT = mk_parse_command_args( );
    FOUTPUT = mk_null( );
    IMPORT I1;
    EXPORT I2;
    EXPORT I3;
}
```

Application Profile using the "Like" Statement

Similar interface profiles may be defined using the LIKE statement. For example, the definition of interface I3, above, can be based on I2 as follows:

```
/* Application Profile for nOde A using
** I1.ipf, I2.ipf and the LIKE statement
*/
#include "I1.ipf"
#include "I2.ipf"
    IMTERFACE I3 LIKE I2 { IDL = "I3.idl" }
    APPLICATION appA {
        FINPUT = mk_parse_command_args( );
        FOUTPUT = mk_null( );
        IMPORT I1;
        EXPORT I2;
        EXPORT I3;
    }
```

APPLICATION PROFILE FOR SIMPLE CLIENT AND SERVER

Consider the case of Client and Server applications running on the same host, where the Server exports interface I1 and the Client imports that interface. The application profile for the two applications might look as follows:

```
/* Application Profile for Simple Client and Server
** running on the same host
*/
INTERFACE I1 {
    PROTSEQ = ncadg_ip_udp;
    BINDTYPE = lepm;
    HANDLE = implicit;
    IDL = "I1.idl";
}
APPLICATION Server {
    FINPUT = mk_parse_command_args( );
    FOUTPUT = mk_stdout( );
    EXPORT I1
}
APPLICATION Client {
    FINPUT = mk_parse_command_args( );
    FOUTPUT = mk_stdout( );
    IMPORT I1
}
```

PARSING COMMAND ARGUMENTS

GLUEGEN provides a default function, mk_parse_command_args(), for parsing application command arguments at run-time. This function takes application profile parameters from the command arguments assuming parameter values are specified as pairs:

-interface.parm value

For example an application named "client" that imports interface I1 may be invoked by:

Client -I1.protseq ncadg_ip_udp -I1.host 129.35.65.223

If the interface part of the parameter specifications is omitted, e.g. Client -protseq ncadg_ip_udp -host 129.35.65.223 the value for these parameters is taken as default for all interfaces.

GLUE RUN TIME LIBRARY

The Glue run time library provides a set of APIs which support DCE programs based on glue-code generated by GLUEGEN. This section presents the Glue APIs together with templates for two programs models: M-Client which imports multiple interfaces, and M-Server which exports multiple interfaces. These programs are designed to work correctly, regardless of the binding method used.

THE GLUE APIS

The Glue APIs are functions of the form IFxxxxx() which make use of data structures defined in the header file <GLUE.H>. Most of the APIs use the following data types:

mk_if_handle_t - handle to interface structure containing the interface profile together with public methods for executing DCE operations mk_app_profile_t - handle to application profile, which is a data structure containing internal representation of an application defined in an APF file.

The APIs are divided into two groups: Application APIs and Binding APIs. Description of each API follows.

Application APIs void IFclient(mk_app_profile_t app, voidfunc FMAIN, int *argc, char argv, char env)

The IFClient function implements an M-Client application model that imports multiple interfaces. The function processes the application profile APP, resolves the unspecified binding parameters, does all required binding operations and calls the FMAIN routine. The function uses static binding and therefore will exit if binding to one of its servers fails. Return Value: None. void IFserver(mk_app_profile_t app, int *argc, char argv, char,env)

The IFServer function implements an M-Server application model that exports multiple interfaces. The function processes the application profile APP, does all required operations to export its interfaces, and listens to incoming requests.

Return Value: None.
Binding APIs mk_if_handle_t IFhandleI(int i)

Get interface handle number I of current application. Interface handle numbers range from 0 to the number of interfaces in the total application, less 1.

Return Value: Interface handle on success, NULL otherwise.

rpc_binding_handle_t IFBindinghandle(mk_if_handle_t IFH)

Get the DCE binding handle stored by GLUEGEN for interface IFH.

Return Value: DCE binding handle on success, NULL otherwise.

Glue-stub API mk_app_profile_t glue_app_profile( void )

Returns the internal representation of an application profile. This function is generated by GLUEGEN for a particular application defined in a given APF file. This function forms the major portion of the glue-stub for that application.

Return Value: Application profile handle.

USING EXPLICIT HANDLES

When using EXPLICIT handles, the user may reference in his application the binding handle associated with each interface. This is facilitated by two functions: IFHandleI() and IFBindinghandle(). For examples, the function handle below, returns the binding handle of interface number i.

```
#include <glue.h>
rpc_binding_handle_t handle(int i)
{
        return ( IFBindingHandle(IFHandleI(i)) );
}
```

PUTTING IT ALL TOGETHER

Figure 7:
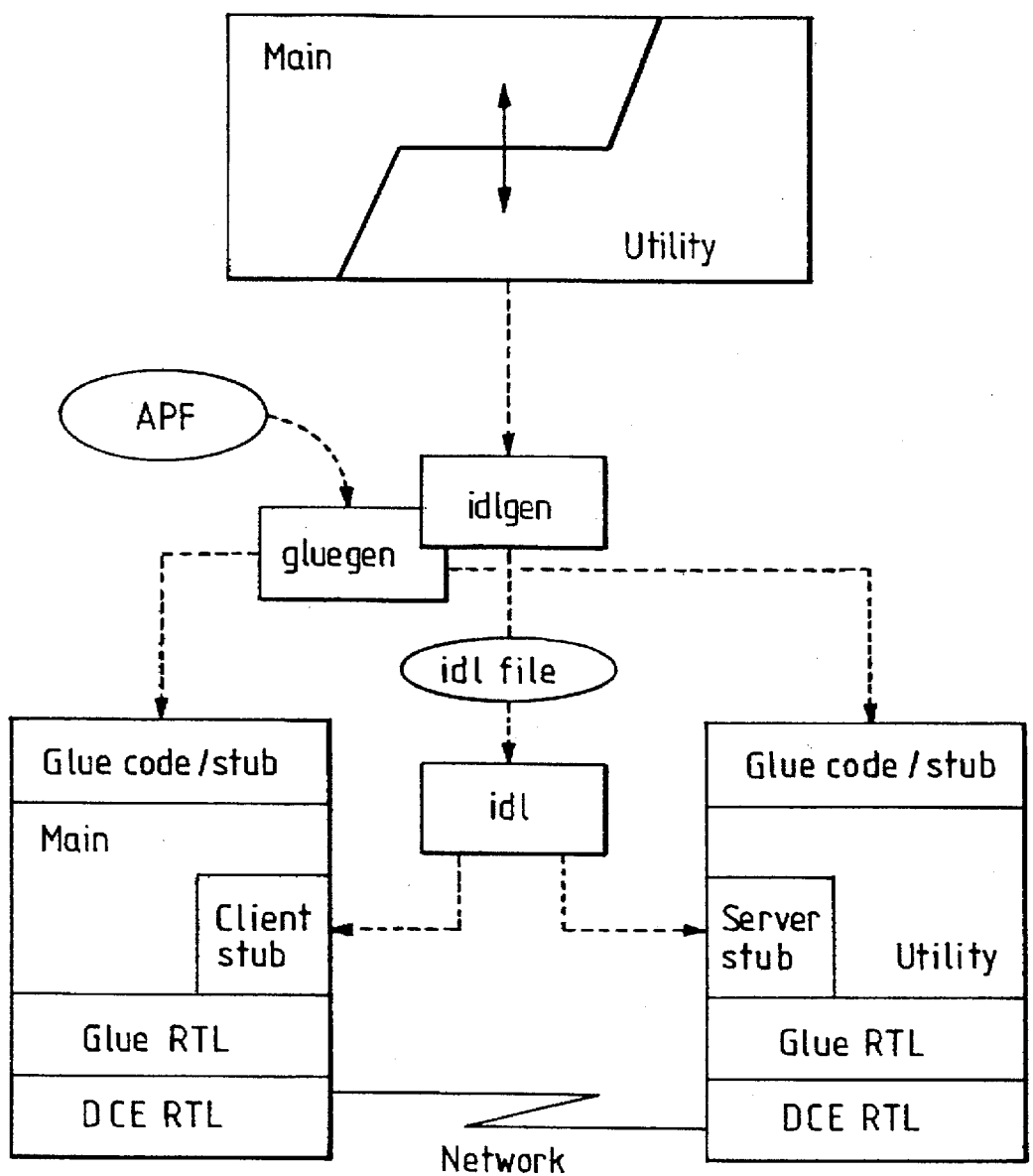
FIG. 7 illustrates a situation where a simple application is split into two programs playing the roles of a Client and a Server.

To demonstrate the relations and sources of the components which make a DCE application, FIG. 7 depicts a situation where a simple application (I) is split to two programs playing the role of a Client and a Server (II).

The components of each application node (Client and Server) are as follows:

1. Glue-code and glue-stub are generated by GLUEGEN from an APF file. Separate pairs of glue-code and glue-stub files are generated for each application; One for the Client, and one for the Server. The glue-codes include the main() entry-points of the Client and Server programs.
2. The glue-library is linked with each program and implements the API used in the glue-code. Application code may also use the API of the glue-lib.
3. Application code in the Client is the Main part of the original application—which performs an RPC to the Server.
4. Application code in the Server is the Utility part of the original application—which implements the RPC performed by the Client.
5. Server-stub is a code generated by the idl compiler (part of DCE) for the Server. The code is generated from an IDL file which represents the interface between the Client and the Server.
6. Client-stub is a code generated by the idl compiler for the Client.
7. DCE RTL is the DCE run-time library which supports the DCE execution environment of DCE applications. This layer uses other lower-level communication support layers in the operating-systems of the respective platforms on which the application nodes execute.

M-Client Program Using Glue APIs

Using the glue-stubs generated by GLUEGEN, a Client program that imports multiple interfaces looks as follows.

```
fmain Function as Model of a non-DCE application void fmain (int argc, char argv, char env)
{
    .
    .
    call server_functions( );
    .
    .
}
M-Client Program include <glue.h>
ifdef IBMOS2
#pragma handler (main)
#endif
```

```
-continued void fmain(int argc, char argv, char env);
main(int argc, char argv, char env)
{
    IFClient(glue_app_profile( ), fmain, &argc, argv, env);
}
M-Server Program Using Glue APIs
```

Using the glue-stubs generated by GLUEGEN, a Server program that export multiple interfaces look as follows.

```
#include <glue.h>
ifdef IBMOS2
#pragma handler (main)
#endif
main(int argc, char **argv, char **env)
{
        IFServer(glue_app_profile( ), &argc, argv, env);
}
```

Glue-stub for a Simple-Server Program

The following glue-stub is generated for the Server application in the APF file in "Application Profile for Simple Client and Server" above. Note that a similar glue-stub (not shown here) is generated for the Client application with different values according to the APF file contents.

The IDL file I1.idl for the interface profile has the following header:

```
[
uuid(0096BF68-065E-1BE6-B951-10005AA8B716),
version(1.0)
] interface binop {
void
binop_add (
    [ in] long a,
    [ in] long b,
    [ in, out, ref] long *c
);
}
#include <glue.h>
extern rpc_if_handle_t
glue_server_ifspec(binop,1,0);
    static struct IFProfileRec I1 = {
        "I1",                           /* name */
        "export",                       /* role */
        "I1.idl",                       /* idl file */
        "implicit",                     /* handle */
        "lepm",                         /* bindtype */
        "ncadg_ip_udp",                 /* protseq */'
        NULL,                           /* host */
        NULL,                           /* endpoint */
        EPTYPE = unique | shared
        NULL,           /* obj */
        NULL,           /* nse */
        &glue_server_ifspec(binop,1,0),  /* ifspec address */
        NULL,/* handle address */
        NULL
    };
    static mk_if_profile_t if_profile_vector[] = {
        &I1,
        NULL
    };
    static struct APProfileRec Server = {
        "Server",                       /* appname */
        1,                              /* nthreads */
        mk_parse_command_args,          /* finput */
        mk_stdout,                      /* foutput */
        1,                              /* ifcount */
        if_profile_vector               /* if_profile_vector */
    };
```

-continued

```
mk_app_profile_t glue_app_profile(void) {
    return (&Server);
};
```

APF LANGUAGE GRAMMAR

Application profile may include C preprocessor directives
Application Profile may include C comment statements
Annotations:

<id>—id is a meta-symbol in the grammar

::=—right-hand side is a definition of left-hand side

|—(vertical bar) separates alternatives of possible right-hand side

[opt]—(square brackets) opt is an optional component of right-hand side

... —(ellipsis) previous entities can repeat as a list with (possibly optional) separator symbol All other symbols and letters are part of the language, except for free English description of right-hand side like for <idl-filename>, etc.

```
<apf>           ::= <INTERFACE> | <APPLICATION> |
                    <INTERFACE> <apf> | <APPLICATION>
                    <apf>
<INTERFACE>     ::= INTERFACE <id> [ like] <id> {
                    <i-attribute> [ ; ] ...
                    }
<APPLICATION>   ::= APPLICATION <id> {
                    <a-attribute> [ ; ] ...
                    }
<i-attribute>   ::= PROTSEQ    = <protseq-val> |
                    BINDTYPE   = <bind-type> |
                    HANDLE     = <handle-val> |
                    HOST       = <host-id> |
                    EP         = <integer> |
                    IDL        = "<idl-filename>" |
                    OBJ        = <obj-uuid> |
                    nse        = <string>
<a-attribute> ::= FINPUT       = <id>( ) |
                    FOUTPUT    = <id>( ) |
                    NTHREADS   = <integer>1
                    IMPORT <id>[ { <i-attribute> [ ; ] ... } ] |
                    EXPORT <id>[ { <i-attribute> [ ; ] ... } ]
<protseq-val> ::= ncadg_ip_udp | ncaca_ip_tcp
    <handle-val>  ::= implicit | explicit | auto
    <bind-type>   ::= string | lepm | repm | ns
    <host-id>     ::= <id> | <tcp-id> | <string>
    <tcp-id>      ::= <integer>.<integer>.<integer>.<integer>
    <idl-filename> ::= legal IDL file name
    <id>          ::= legal C identifier
    <obj-uuid>    ::= DCE uuid value
    <integer>     ::= <digit>...
    <string>      ::= <letter>..."
    <digit>       ::= 0|1|2|3|4|5|6|7|8|9
    <letter>      ::= any printable character
```

We claim:

1. A software tool for converting a non-distributed application program to a Distributed Computing Environment distributed application, said software tool comprising:

means for parsing said program to extract therefrom semantic information of procedures to be called by a remote procedure call;

means for automatically detecting conflict between said extracted semantic information and an input Interface Definition Language file;

means for reporting said conflict to a user;

means for generating an output Interface Definition Language file;

means for enabling a user to alter said output Interface Definition Language file to become a next said input Interface Definition Language file;

means for causing performance of said parsing, detecting, generating, reporting and enabling iteratively on successive said next Input Definition Language files until correct said Interface Definition Language files are generated;

means enabling a user to generate an application profile defining the structure of said distributed application;

means for generating from said application profile glue code for supporting the execution of said distributed application; and whereby said output Interface Definition Language file, or an Interface Definition Language file derived from said output Interface Definition Language file, is invoked by an Interface Definition Language compiler to generate files for compiling and linking with said glue code and a Distributed Computing Environment run-time library to form at least a client or server application.

* * * * *